Aug. 15, 1944.   B. S. FLORADAY   2,355,791
HANDLE FOR VEHICLE DOORS
Filed July 30, 1941   3 Sheets-Sheet 1

Burton S. Floraday
INVENTOR

BY
ATTORNEY

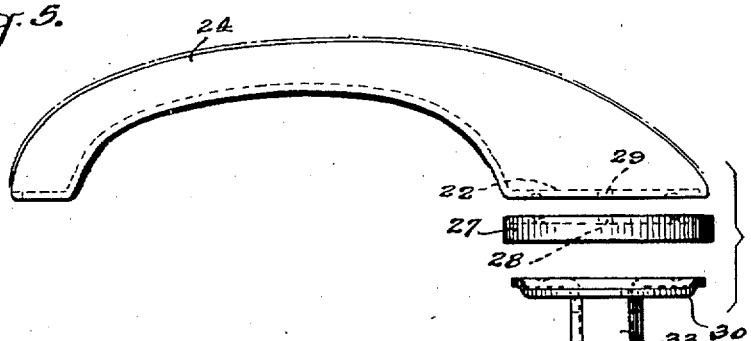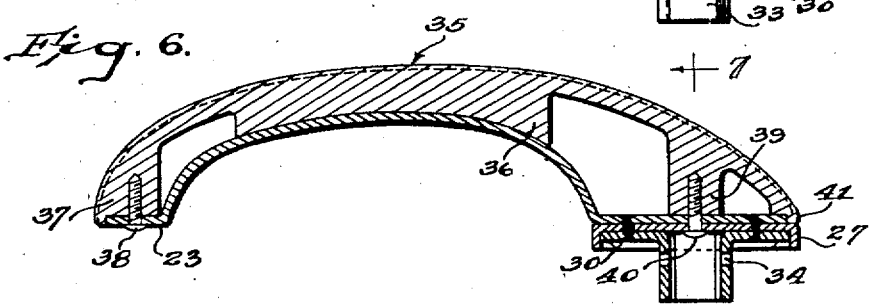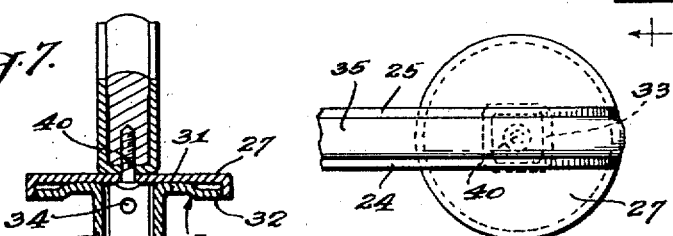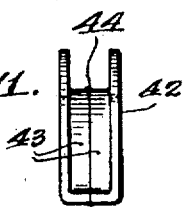

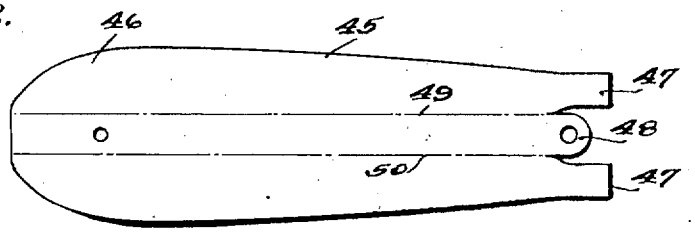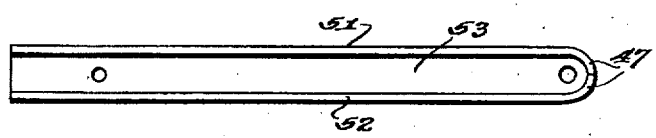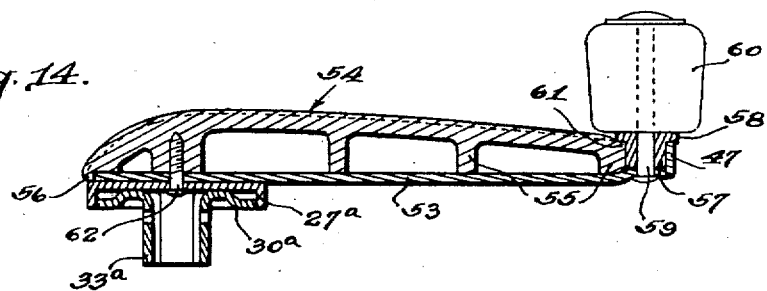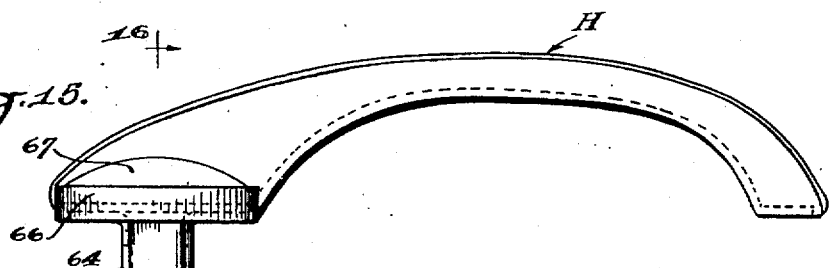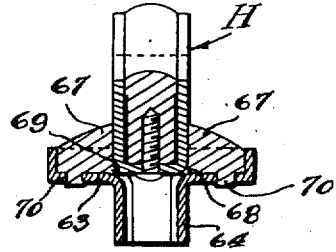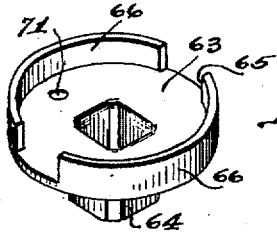

Patented Aug. 15, 1944

2,355,791

UNITED STATES PATENT OFFICE 2,355,791

HANDLE FOR VEHICLE DOORS

Burton S. Floraday, Toledo, Ohio, assignor to Detroit Harvester Company, Detroit, Mich., a corporation of Michigan Application July 30, 1941, Serial No. 404,605

7 Claims. (Cl. 292—347)

This invention relates to handles for use in connection with vehicle doors but more particularly to handles of this character employing ornamental strips or devices, such, for example, as a handle, the body of which is metal and an ornamental portion of which is a plastic.

An object is to produce a handle of the above character which lends itself readily to large volume production, which is sturdy in construction, easy to assemble and which, in the main, may be produced from sheet metal stampings.

Another object is to produce a handle, the body of which is of sheet metal and which embodies, as a separate part, an ornamental strip.

A further object is to produce a handle of sheet metal formed with a channel to receive an ornamental piece which is retained within the channel in a new and improved manner.

A still further object is to produce a simple and efficient method for producing a handle of the above character from sheet metal stampings which lends itself particularly to large volume production.

A still further object is to produce a new and improved means for securing ornamental parts, such as plastic parts, in handles of the above character by which such parts may be readily and conveniently applied with a minimum of fastening devices.

Other objects and advantages reside in details of construction, arrangement and assembly as will hereinafter appear and, for purposes of illustration but not of limitation, embodiments of the invention are shown in the accompanying drawings in which Figure 1 is a top plan view of a blank from which the body portion of the handle is formed;

Figure 5 is a composite side elevation of the parts of the door handle;

Figure 6 is a longitudinal sectional elevation of the completed door handle with the ornamental strip secured in position;

Figure 7 is a vertical sectional elevation substantially on the line 7—7 of Figure 6;

Figure 8 is a fragmentary top plan view of the handle assembly shown on Figure 6;

Figure 9 is a plan view of one of the two blanks used in making up the handle body, indicating an alternate method, differing from Figure 1, in which the two sections are formed from a single blank;

Figure 10 is a top edge elevation of the blank section shown on Figure 9;

Figure 11 is an end elevation showing two blanks according to Figures 9 and 10, welded or brazed together;

Figure 12 is a plan view of a blank employed in forming the body of a regulator handle;

Figure 13 is a top plan view of the body of the regulator handle formed from the blank shown on Figure 12;

Figure 14 is a longitudinal sectional elevation of the completed regulator handle with the ornamental strip and operating knob secured in position;

Figure 15 is a side elevation of an alternate form of door handle;

Figure 16 is a vertical sectional elevation on the line 16—16 of Figure 15, showing particularly the manner in which the semi-circular ornamental parts are retained in position of use;

Figure 17 is a top perspective view of the shaft engaging part of the handle shown on Figures 15 and 16; and Figure 18 is a fragmentary perspective view similar to Figure 4, showing a reenforcing strip welded to the handle.

Figure 1:
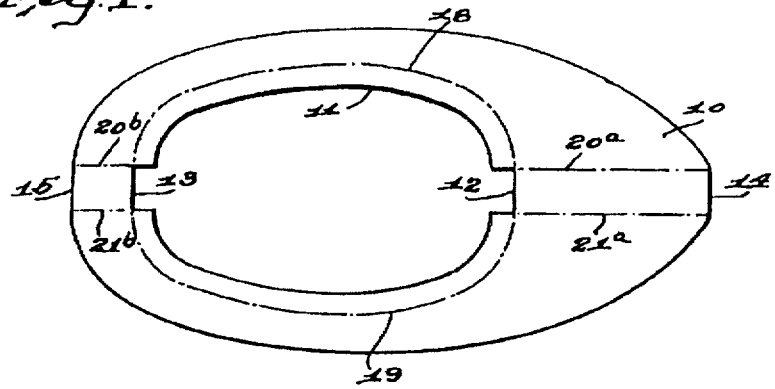
Figure 2:
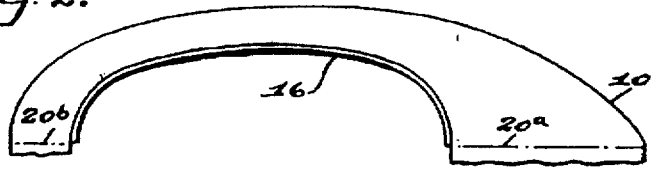
Figure 2 is a fragmentary elevation of the blank shown in Figure 1, after the flange portion has been formed.

The illustrated embodiment of the invention shown on Figures 1 to 8 comprises a vehicle door handle and its method of manufacture. The body of the handle is formed from a sheet metal blank 10 which is generally oval in form with an elongate or oval opening 11, cut outs 12 and 13 at opposite ends of the opening aligning with each other and with the flattened outer end portions 14 and 15 respectively of the blank. After the blank is cut from a sheet of metal, the next step is the formation of flanges 16 and 17. The flange 16 is formed by bending the metal at the edge of the opening 11 at the upper edges of the cut out along the dot and dash line 18 and the flange 17 is formed by folding up an edge of the metal on the lower portion of the blank shown in Figure 1 along the dot and dash line 19. Each of these flanges is bent to a position substantially at right angles to the body of the blank.

Figure 3:
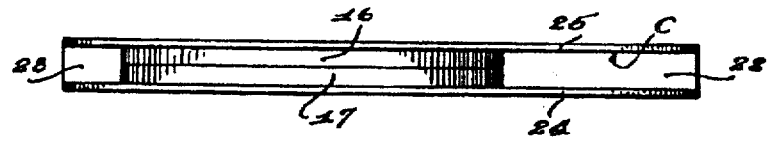
Figure 3 is a top plan view of the sheet metal body portion of the handle after it has been bent or folded into the desired position with the arcuate flanges in abutting relation.

Thereafter the upper portion of the blank shown in Figure 1 is bent along the dot and dash lines 20a and 20b and the lower portion is bent along the dot and dash lines 21a and 21b, thereby bringing the flanges 16 and 17 into abutting relation as indicated on Figure 3. It will be seen that the end wall portions 22 and 23 are integral with the laterally spaced parallel side walls 24 and 25, the end wall 22 being considerably longer than the end wall 23 as will be manifest from an inspection of the blank shown in Figure 1. Likewise it will be evident that the depth of the channel or cavity formed between the walls 24 and 25 varies in view of the configuration of the structure, thereby forming a curved hand hold portion suitably shaped to be grasped conveniently.

Figure 4:
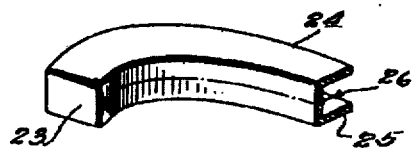
Figure 4 is a fragmentary perspective view showing particularly the under side of the body portion of the handle with the seam welded or brazed together.

If desired, the seam along the line of contact between the abutting flanges 16 and 17 may be brazed or welded, as indicated at 26 on Figure 4, thereby integrally joining the flanges and affording a smoother under surface for grasping the handle.

Secured to the longer end wall 22 of the handle body is a sheet metal cup-shaped disc 27. The sheet metal cup 27 has a diameter slightly greater than the length of the end wall 22 of the handle body. The flange of the cup 27 is relatively short and extends downwardly away from the body portion, as indicated particularly on Figures 5 and 6. As shown on Figures 7 and 8, the cup projects laterally from opposite sides of the handle body portion. Formed in the cup is a central screw receiving opening 28 which aligns with an opening 29 formed in the wall 22 of the handle body portion.

Fitting within the cup 27 is a disc-like member 30, the central portion 31 (Figure 7) of which abuts against the inside of the cup 27 and the outer portion 32 of which has its under side substantially flush with the lower edge of the depending cup flange. The disc portion 30 has an extruded tube 33 which is substantially square in cross section to fit over the usual handle shaft for operating the vehicle door latch, as will be readily understood by those skilled in the art, holes 34 being provided in the side of the tubular socket portion 33 for securing the handle in position. The disc member 30, the cup 27 and the end wall 22 of the handle body are preferably spot welded together, thereby to produce in effect a one-piece structure.

The channel C formed between the walls 24 and 25 of the body portion is admirably adapted to receive an ornamental strip of any suitable material, such for example as Tenite, Bakelite, Plaskon or metal, the outer edge portion of which may be flush or substantially flush and substantially co-extensive with the free edges of the walls 24 and 25. A web 36 depends from the central portion of the strip and is shaped to snugly fit the bottom of the channel formed by the abutting flanges 16 and 17. Likewise at the outer end of the strip is a web 37 which abuts and slightly overlaps in flush relation the end wall 23 of the handle body, a screw 38 passing through an opening in the wall 23 and into the strip 35, assisting in holding the strip in place. Adjacent the opposite end of the strip 35 is a depending lug or web 39 and a screw 40 which is inserted through the socket portion 33 and, through the registering apertures 28 and 29, embeds itself in the material forming the lug 39. It will be observed that the inner end 41 of the strip 35 extends slightly beyond the end wall 22 so that the outer surface is substantially flush with the adjacent flange portion of the cup 27.

As indicated in Figures 9 to 11, the body of the handle may be formed from a pair of stamped sheet metal segments 42, each of which is formed with a flange 43. The individual segments are then placed in abutting relation, as indicated in Figure 11, and the seam brazed as indicated at 44 to cause the metal to flow together, thereby to produce an integral structure. It will be apparent that the segments 42 may be stamped from a sheet of metal and the various segments are similar in size and shape to each other, thereby expediting production and reducing the cost of manufacture. It will be manifest that the individual segments are of the size and shape hereinbefore described with a relatively long end wall at one end and a relatively short end wall at the opposite end, the edge portion of the segment blank being curvilinear and of a contour in accordance with that hereinbefore described.

The form of the invention shown on Figures 12 to 14 is that of a regulator handle which is mounted on the inside of the vehicle door for manually operating the regulator mechanism to raise and lower the window glass. The sheet metal blank 45 from which the handle body is formed is shown on Figure 12, from which it will be observed that one end portion indicated at 46 is enlarged and from that end the blank gradually tapers. At the opposite end is a pair of flap extensions 47 between which is disposed a rounded bottom wall projection 48 which is slightly shorter than the flap extensions 47. The sides of the blank 46 are folded or bent along the dot and dash lines 49 and 50 thereby to provide side walls 51 and 52 and a bottom wall 53. The end flaps 47 are bent or folded about the rounded end wall portion 48 into abutting relation to form a rounded end wall, as indicated on Figure 13. As shown in Figure 14, the wall projection 48 is slightly embossed upwardly. Secured to the inner end of the bottom wall 53 or at the end remote from the flaps 47 is a flange cup 27a into which fits a disc 30a which is formed with the shaft engaging sleeve or socket member 33a for engaging the regulator operating shaft. The construction and assembly of the parts 27a, 30a and 33a is similar to the construction and assembly of the parts 27, 30 and 33 described in connection with the form of the invention illustrated on Figures 5 to 8 so that more detail description thereof is not considered necessary in connection with this form.

It will be apparent that between the walls 51 and 52 is a channel which receives an ornamental strip 54 preferably of plastic material such as Bakelite, Tenite or the like. The plastic strip 54 is formed with a series of legs or webs 55 which are spaced longitudinally of the strip and abut against the bottom wall 53 of the handle body. The outer surface of the strip 54 corresponds to the contour of the outer or free edges of the walls 51 and 52 so as to lie approximately flush therewith. The inner end of the strip indicated at 56 slightly overlaps the adjacent end of the bottom wall 53 and abuts against the adjacent portion of the cup 27a substantially as shown on Figure 14.

On the free end of the handle body is a bushing 57 which abuts against the inner side of the embossed portion of the handle body and the outer end portion is formed with an annular flange 58 which overlaps the free edge of the flap portions 47. A rivet 59 passes through the bottom wall 53, bushing 58 and a knob 60 which rests against the flange portion 58 of the bushing, the knob providing an operating knob for the handle.

An important feature of this form of the invention resides in the manner in which the ornamental strip 54 is retained in position. It will be observed that the outer end portion of the strip 54 has an extension 61 which is first inserted beneath the flange 58 of the bushing so that the flange 58 holds the strips 54 from lateral movement away from the wall 53 of the handle body. Obviously the bushing 57 prevents longitudinal movement of the strip in one direction. The opposite end portion of the ornamental strip 54 is retained by a screw 62 which passes through aligned openings in the cup 27a and bottom wall 53 and into the adjacent web of the strip 54. Thus the screw 62 retains the inner end portion of the strip in position. In this manner it will be observed that the outer end of the ornamental strip 54 is retained in place without the use of separate fasteners, the shoulder formed on the bushing 57 being sufficient to retain the strip in the desired position and a single fastener at the opposite end portion of the strip is all that is necessary for the purpose. Obviously this arrangement greatly facilitates assembly and materially reduces the cost of manufacture and assembly.

In the form of the invention illustrated in Figures 15 to 17, the handle H is shown as that of a door handle hereinbefore shown and described in connection with Figures 1 to 11 although it will be understood that the handle may be of the form illustrated in Figures 12 to 14. In this instance, the inner end of the handle is suitably secured as by spot welding to a disc 63 from which depends a shaft engaging sleeve or socket portion 64 of substantially square cross section. The handle H abuts against the disc 63 and is disposed in a pair of aligned notches 65 formed between arcuate upstanding walls or flanges 66.

Between each side wall of the handle and the adjacent upstanding wall 66 is an ornamental piece 67 of plastic material, such as Tenite or Bakelite. The outer wall of each of the pieces 67 may be upwardly curved and the side walls thereof fit snugly against the adjacent wall 66 and the bottom against the disc 63. Each of the ornamental pieces 67 is formed with a lip 68 which fits between the rounded corner portion 69 of the sheet metal body of the handle H and the upper surface of the disc 63 thereby holding the inner portion of the ornamental piece 67 in position. A lug 70 depends from the bottom of each piece 67 and passes through an opening 71 in the disc 63, this part being upset or headed on the under side of the disc 63 to assist in retaining the ornamental piece in position. In this manner it is apparent that the two ornamental pieces 67 are retained in place without the use of any special fastening devices.

In each of the handles above described, if additional reenforcement is desired, a metal strip 26' may be applied to the bottom wall as indicated on Figure 18. The strip 26' may be coextensive with the bottom wall or extend only a part of its length as desired and is welded in position in any suitable manner. In the form shown the strip 26' is applied to a structure as shown in Figure 4 having the side walls 24' and 25' and end wall 23'.

It is to be understood that numerous changes in details of construction, arrangement and operation may be effected without departing from the spirit of the invention especially as defined in the appended claims.

What I claim is:

1. In a handle of the class described, a sheet metal body portion, said body portion having elongate side walls spaced laterally from each other to provide a channel, a pair of end walls rigid with opposite end portions of said side walls, inturned flanges on the lower edge portions of said side walls arranged in abutting relation and providing the bottom wall of said channel, an ornamental strip fitting said channel, a web depending from said strip and engaging the bottom wall of the channel, means for securing said strip in place, and means rigid with one end wall providing a shaft engaging socket.

2. In a handle of the class described, a sheet metal body portion, said body portion having elongate arcuate side walls spaced laterally from each other to provide a channel, a pair of end walls rigid with said side walls, inturned flanges on the lower edge portions of said side walls arranged in abutting relation and providing the bottom wall of said channel, an ornamental strip fitting said channel having its outer portion substantially flush with the free edge portion of said side walls, a web depending from said strip and contacting the bottom wall of said channel, means for securing said strip to said body portion, a downwardly flanged plate secured to one of said end walls, a plate fitting within the flange on said first plate, and a shaft receiving socket member rigid with said second plate.

3. In a handle of the class described, a sheet metal body portion, said body portion having elongate arcuate side walls spaced laterally from each other to provide a channel, a pair of end walls rigid with said side walls, inturned flanges on the lower edge portions of said side walls arranged in abutting relation and providing the bottom wall of said channel, an ornamental strip fitting said channel having its outer portion substantially flush with the free edge portion of said side walls, a web depending from said strip and contacting the bottom wall of said channel, means for securing said strip to said body portion, a downwardly flanged plate secured to one of said end walls, a plate fitting within the flange on said first plate, a shaft receiving socket member rigid with said second plate, and edge portions of said second plate being substantially flush with the free edge of the flange on said first plate.

4. In a handle of the class described, a sheet metal body portion, said body portion having elongate arcuate side walls spaced laterally from each other to provide a channel, a pair of end walls rigid with said side walls, inturned flanges on the lower edge portions of said side walls arranged in abutting relation and providing the bottom wall of said channel, an ornamental strip fitting said channel having its outer portion substantially flush with the free edge portion of said side walls, a web depending from said strip and contacting the bottom wall of said channel, means for securing said strip to said body portion, an annular disc of slightly greater diameter than the length of one end wall abutting against the latter, a downturned annular flange on said disc, a disc fitting within said downturned flange, and a shaft engaging socket member rigid with said last disc, said strip securing means including a fastener insertable through said socket member and passing through both discs and the adjacent bottom wall and into said strip.

5. In a handle of the class described, a sheet metal body portion, said body portion having elongate arcuate side walls spaced laterally from each other to provide a channel, a pair of end walls rigid with said side walls, inturned flanges on the lower edge portions of said side walls arranged in abutting relation and providing the bottom wall of said channel, an ornamental strip fitting said channel having its outer portion substantially flush with the free edge portion of said side walls, a web depending from said strip and contacting the bottom wall of said channel, means for securing said strip to said body portion, an annular disc of slightly greater diameter than the length of one end wall abutting against the latter, a downturned annular flange on said disc, a portion of said strip overlapping said last end wall and having its outer surface substantially flush with the outer surface of said disc flange, a disc fitting within said downturned flange, and a shaft engaging socket member rigid with said last disc, said strip securing means including a fastener insertable through said socket member and passing through both discs and the adjacent bottom wall and into said strip.

6. In a handle of the class described, a sheet metal body portion of channel form, a strip of plastic material fitting said channel, a mounting for said body portion, said mounting comprising a disc having upstanding side walls, opposed notches in said side walls to receive the body portion therebetween, with the side walls spaced therefrom, portions of said handle adjoining said disc being rounded, an ornamental piece on each side of said body portion, having a lip interposed between said rounded handle portion and said disc with the outer end thereof upset, and an integral shaft engaging socket portion depending from said disc.

7. In a handle for vehicle doors, a sheet metal body portion, said body portion having a bottom wall and a pair of elongate side walls, said side walls, including the free edge portion thereof, being arranged in substantially parallel spaced relationship, thereby to provide a relatively narrow elongate channel, end walls on said body portion for opposite ends of the channel, a plastic ornamental strip substantially filling said channel and abutting the inside of said end walls, fastener means for anchoring said strip in place, and mounting means rigid with an end wall providing a laterally extending shaft engaging socket enabling the handle to be employed for shaft turning movements.

BURTON S. FLORADAY.